United States Patent
Venkatasubramanian et al.

(10) Patent No.: US 10,904,839 B2
(45) Date of Patent: Jan. 26, 2021

(54) INTERFERENCE CONTROL IN CELLULAR COMMUNICATION SYSTEM

(71) Applicant: NOKIA SOLUTIONS AND NETWORKS OY, Espoo (FI)

(72) Inventors: Venkatkumar Venkatasubramanian, Wroclaw (PL); Anna Maria Lukowa, Prabuty (PL)

(73) Assignee: Nokia Solutions and Networks Oy, Espoo (FI)

( * ) Notice: Subject to any disclaimer, the term of this patent is extended or adjusted under 35 U.S.C. 154(b) by 105 days.

(21) Appl. No.: 16/089,343

(22) PCT Filed: Mar. 31, 2016

(86) PCT No.: PCT/EP2016/057100
§ 371 (c)(1),
(2) Date: Sep. 28, 2018

(87) PCT Pub. No.: WO2017/167379
PCT Pub. Date: Oct. 5, 2017

(65) Prior Publication Data
US 2020/0229107 A1    Jul. 16, 2020

(51) Int. Cl.
*H04W 52/24*    (2009.01)
*H04B 17/345*    (2015.01)
*H04W 52/14*    (2009.01)
*H04W 72/08*    (2009.01)

(52) U.S. Cl.
CPC ........ *H04W 52/243* (2013.01); *H04B 17/345* (2015.01); *H04W 52/146* (2013.01); *H04W 52/242* (2013.01); *H04W 72/082* (2013.01)

(58) Field of Classification Search
CPC ............. H04W 52/243; H04W 52/146; H04W 52/242; H04W 72/082; H04B 17/345
See application file for complete search history.

(56) References Cited

U.S. PATENT DOCUMENTS

| 2013/0114562 A1* | 5/2013 | Seo ................... H04W 52/16 370/329 |
| 2013/0242744 A1* | 9/2013 | Wigren ............ H04W 28/0236 370/236 |

(Continued)

OTHER PUBLICATIONS

International Search Report and Written Opinion for International Application No. PCT/EP2016/057100, dated Nov. 25, 2018 (13 pages).

(Continued)

*Primary Examiner* — Md K Talukder
(74) *Attorney, Agent, or Firm* — Brake Hughes Bellermann LLP (57) ABSTRACT

This document discloses a solution for inter-cell interference control in a cellular communication system. A method comprises: detecting, by an access node managing an interfered cell in a cellular communication system, inter-cell interference from an interfering cell; determining whether or not interference cancellation performed for a signal received through the access node is capable of cancelling said inter-cell interference; and controlling, on a basis of a result of said determining, uplink transmit power of a terminal device on time-frequency resources allocated to the terminal device.

18 Claims, 5 Drawing Sheets

(56) References Cited

U.S. PATENT DOCUMENTS

| | | | | |
|---|---|---|---|---|
| 2015/0146638 | A1* | 5/2015 | Ohwatari | H04W 16/14 370/329 |
| 2016/0066288 | A1* | 3/2016 | Feng | H04W 52/54 370/280 |
| 2018/0123719 | A1* | 5/2018 | Venkatasubramanian | H04L 1/0003 |

OTHER PUBLICATIONS

3GPP TS 36.213 V9.1.0 (Mar. 2010); 3rd Generation Partnership Project; Technical Specification Group Radio Access Network; Evolved Universal Terrestrial Radio Access (E-UTRA); Physical layer procedures (Release 9); Sophia Antipolis, France; Mar. 2010; 79 pages.

3GPP TR 36.866 V12.0.1 (Mar. 2014); 3rd Generation Partnership Project; Technical Specification Group Radio Access Network; Study on Network-Assisted Interference Cancellation and Suppression (NAIC) for LTE (Release 12); Sophia Antipolis, France; Mar. 2014; 64 pages.

Poulkov et al.; "Combined Power and Inter-Cell Interference Control for LTE Based on Role Game Approach"; 34th International Conference on Telecommunications and Signal Processing (TSP); Aug. 18, 2011; pp. 213-217.

Liu et al.; "Uplink Power Control and Interference Coordination for Heterogeneous Network"; 23rd International Symposium on Personal, Indoor and Mobile Radio Communications (PIMRC); Sydney, Australia; Sep. 9-12, 2012; pp. 519-523.

Pavlina et al.; "Risk Assessment Based LTE HetNet Uplink Power and Interference Control"; 2015; 38th International Conference on Telecommunications and Signal Processing (TSP); Jul. 9, 2015; pp. 210-214.

3GPP TSG-RAN WG1 #72; R1-130591; "Channel models for indoor small cells"; Qualcomm Incorporated; St. Julian's, Malta; Jan. 28-Feb. 1, 2013.

Office Action for European Application No. 16714374.2, dated Sep. 6, 2019, 5 pages.

Office Action for European Application No. 16714374.2, dated Mar. 20, 2020, 6 pages.

Office Action for European Application No. 16714374.2, dated Aug. 27, 2020, 5 pages.

* cited by examiner

INTERFERENCE CONTROL IN CELLULAR COMMUNICATION SYSTEM

CROSS-REFERENCE TO RELATED APPLICATIONS

This application is a national stage entry of PCT Application No. PCT/EP2016/057100 filed Mar. 31, 2016, entitled "INTERFERENCE CONTROL IN CELLULAR COMMUNICATION SYSTEM" which is hereby incorporated by reference in its entirety.

TECHNICAL FIELD

The invention relates to cellular communication systems and, in particular, to a solution for carrying out interference coordination in such a system.

BACKGROUND

In a cellular communication system where neighbouring cells operate on the same frequency band, the cells may interfere with each other through inter-cell interference. The inter-cell interference may affect uplink communication more than downlink communication because of limited transmission power capabilities of terminal device. The inter-cell interference may comprise uplink-to-uplink interference where uplink transmissions of the neighbouring cells interfere with one another. The inter-cell interference may comprise downlink-to-uplink interference where downlink transmissions in one cell interfere with uplink transmissions in another cell.

BRIEF DESCRIPTION

The invention is defined by the subject matter of the independent claims. Some embodiments are defined in the dependent claims.

BRIEF DESCRIPTION OF THE DRAWINGS

In the following the invention will be described in greater detail by means of preferred embodiments with reference to the accompanying drawings, in which.

DETAILED DESCRIPTION OF EMBODIMENTS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented in a radio system, such as in at least one of the following: Universal Mobile Telecommunication System (UMTS, 3G) based on basic wideband-code division multiple access (W-CDMA), high-speed packet access (HSPA), Long Term Evolution (LTE), LTE-Advanced, and/or 5G system.

The embodiments are not, however, restricted to the system given as an example but a person skilled in the art may apply the solution to other communication systems provided with necessary properties. One example of a suitable communications system is the 5G system, as listed above. 5G has been envisaged to use multiple-input-multiple-output (MIMO) multi-antenna transmission techniques, many more base stations or nodes than the current network deployments of LTE (a so-called small cell concept), including macro sites operating in co-operation with smaller local area access nodes and perhaps also employing a variety of radio technologies for better coverage and enhanced data rates. 5G will likely be comprised of more than one radio access technology (RAT), each optimized for certain use cases and/or spectrum. 5G mobile communications will have a wider range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or cloud data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent. Some other technology advancements probably to be used are Software-Defined Networking (SDN), Big Data, and all-IP, which may change the way networks are being constructed and managed.

Figure 1:
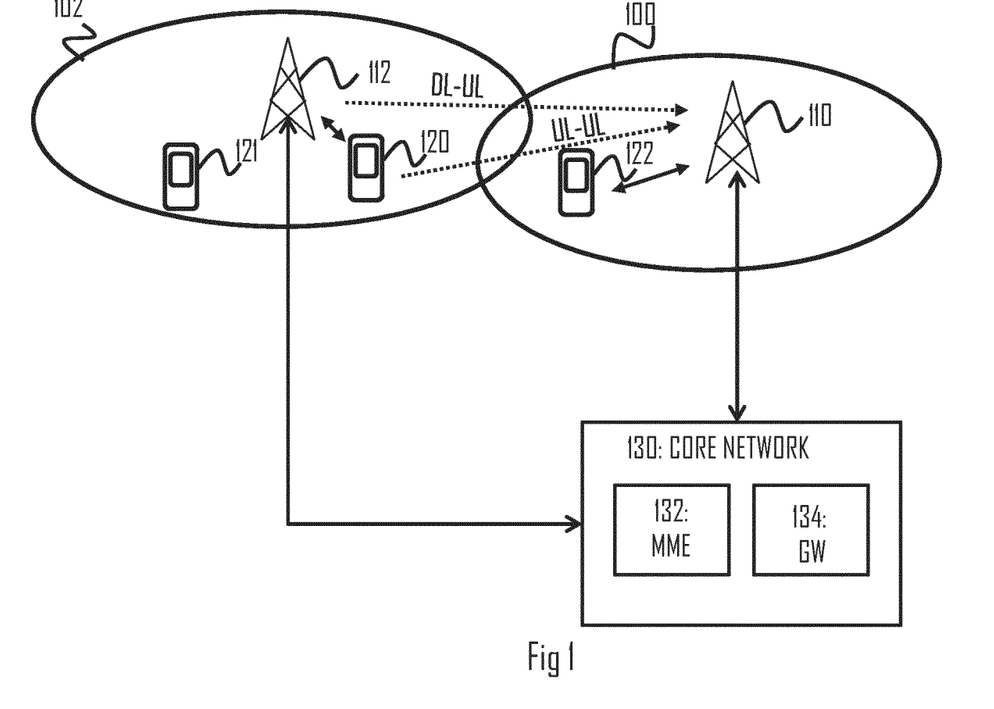
FIG. 1 illustrates a wireless communication scenario to which embodiments of the invention may be applied.

FIG. 1 illustrates an example of a communication system to which embodiments of the invention may be applied. The system may comprise access nodes 110, 112 providing respective cells 100, 102. Each cell may be, e.g., a macro cell, a micro cell, femto, or a pico cell, for example. In another point of view, the cell may define a coverage area or a service area of the access node 110, 112. The network node 110 may be an evolved Node B (eNB) as in the LTE and LTE-A, an access point of an IEEE 802.11-based network (Wi-Fi or wireless local area network, WLAN), or any other apparatus capable of controlling radio communication and managing radio resources within a cell. For 5G solutions, the implementation may be similar to LTE-A, as described above. The access node 110, 112 may be called a base station or a network node. The system may be a cellular communication system composed of a radio access network of access nodes 110, 112, each controlling a respective cell or cells 100, 102. The access nodes 110 to 112 may provide terminal devices 120, 121, 122 with wireless access to other networks such as the Internet. Additionally, one or more local area access nodes may be arranged within a control area of a macro cell access node. The local area access node may provide wireless access within a sub-cell that may be comprised within a macro cell. Examples of the sub-cell may include a micro, pico and/or femto cell. Typically, the sub-cell provides a hot spot within a macro cell. The operation of the local area access node may be controlled by an access node under whose control area the sub-cell is provided.

In the case of multiple access nodes in the communication network, the access nodes may be connected to each other with an interface. LTE specifications call such an interface as X2 or S1 interface. In IEEE 802.11 networks, a similar interface is provided between access points. Other communication methods between the access nodes may also be possible. The access nodes 110 to 112 may be further connected via another interface to a core network 130 of the cellular communication system. The LTE specifications specify the core network as an evolved packet core (EPC), and the core network may comprise a mobility management entity (MME) 132 and a gateway node 134. The MME may handle mobility of terminal devices in a tracking area encompassing a plurality of cells and also handle signalling connections between the terminal devices and the core network 130. The gateway node 134 may handle data routing in the core network 130 and to/from the terminal devices.

The radio system of FIG. 1 may support Machine Type Communication (MTC). MTC may enable providing service for a large amount of MTC capable devices, such as the at least one terminal device 120, 121, 122. The at least one terminal device 120, 121, 122 may comprise mobile phones, smart phones, tablet computers, laptops and other devices used for user communication with the radio communication network, such as a MTC network. These devices may provide further functionality compared to the MTC scheme, such as communication link for voice, video and/or data transfer. However, in MTC perspective the at least one terminal device 120, 121, 122 may be understood as a MTC device. It needs to be understood that the at least one terminal device 120, 121, 122 may also comprise another MTC capable device, such as a sensor device providing position, acceleration and/or temperature information to name a few examples.

Figure 2:
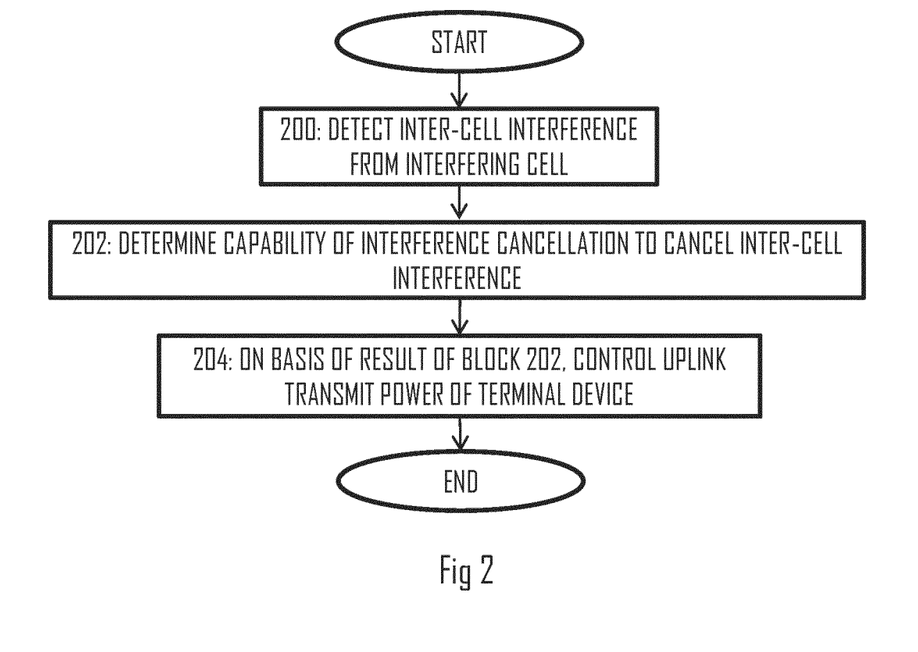
FIG. 2 illustrates a flow diagram of an embodiment for interference control in an access node.

As discussed in the Background section, if the access nodes 110, 112 provide communications in the same frequency band or overlapping frequency bands the communications in the cells 100, 102 may interfere with one another. While the interference is bidirectional, let us for the sake of simplicity consider interference from the devices 112, 120, 121 of the cell 102 towards the devices 110, 122 of the cell 100. Therefore, let us call the cell 102 an interfering cell and the cell 100 as an interfered cell. The transmissions of the access node 112 may cause interference to at least uplink communications in the cell 100 (DL-UL interference), and transmissions of the terminal devices 120, 121 may cause interference to at least the uplink communications in the cell 100 (UL-UL interference). As a consequence, the transmissions in the interfering cell may interfere reception in the access node 110. The access node 110 may perform interference cancellation in an attempt to cancel interfering signal components from a received signal. Such interference cancellation may be realized by employing an interference cancellation algorithm such as a receiver based on maximum likelihood estimation, successive interference cancellation on a symbol level, or to successive interference cancellation on a codeword level. In a situation where the capabilities of the interference cancellation are not sufficient to enable correct uplink signal detection and decoding in the access node, the access node may have to employ other means to manage the interference. FIG. 2 illustrates an embodiment for interference control in an apparatus. The apparatus executing a process of FIG. 2 may be an apparatus suitable for the access node 110. The apparatus may be the access node 110 or an apparatus comprised in the access node 110.

Referring to FIG. 2, the process comprises: detecting (block 200), by an access node managing an interfered cell in a cellular communication system, inter-cell interference from an interfering cell; determining (block 202) whether or not interference cancellation performed for a signal received through the access node is capable of cancelling said inter-cell interference; and controlling (block 204), on a basis of a result of said determining, uplink transmit power of a terminal device on time-frequency resources allocated to the terminal device.

The process of FIG. 2 may provide an advantage of improved interference control in a situation where the inter-cell interference is present and the interference cancellation is not capable of cancelling the inter-cell interference.

In an embodiment, the terminal device is a terminal device of the interfered cell 100.

In an embodiment, the terminal device is a terminal device of the interfering cell 102.

Figure 3:
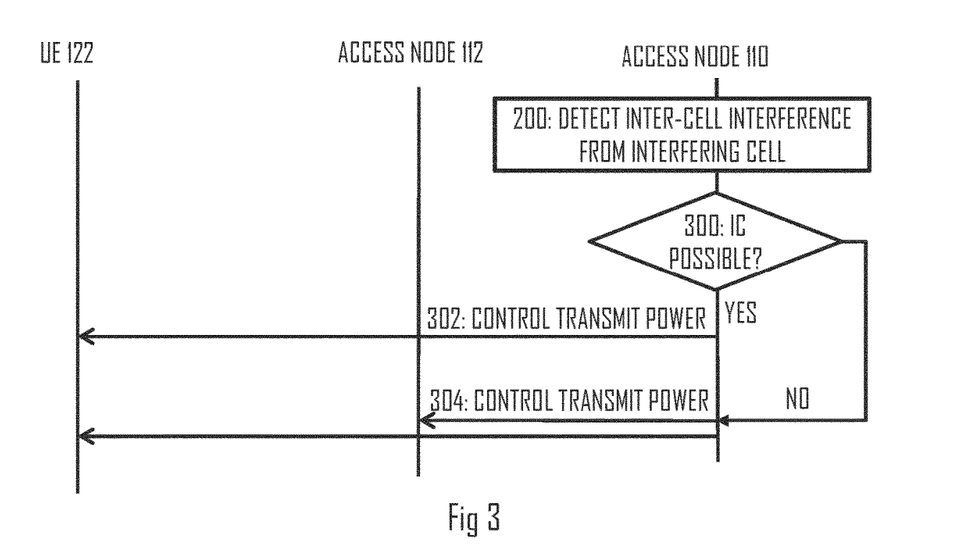
FIG. 3 illustrates a signalling diagram of an embodiment for interference control in a wireless system of FIG. 1.

FIG. 3 illustrates an embodiment of the process of FIG. 2 in the form of a signalling diagram illustrating the transmit power control performed as a function of the inter-cell interference cancellation capability. Referring to FIG. 3, the access node may detect the inter-cell interference from the interfering cell. The detection may be based on scheduling decisions made by each access node 110, 112. The access nodes may exchange, for example, radio frame configurations with one another. The exchanged radio frame configuration may specify which sub-frames of a radio frame are uplink sub-frames and which downlink sub-frames or, from another viewpoint, uplink/downlink scheduling decisions in the radio frame(s). In a case where an uplink sub-frame of the interfered cell 110 overlaps with a downlink sub-frame of the interfering cell or a dominant interfering cell, the access node 110 may determine that DL-UL interference is present. The dominant interfering cell may be considered as an interfering cell that causes a dominant part of interference towards the interfered cell. A further condition may be that the access node 112 has scheduled a downlink transmission to such a sub-frame. The access nodes may also measure transmissions of neighbouring access nodes and evaluate the capability of the interference cancellation to cancel the downlink inter-cell interference. The evaluation may be based on testing whether or not the interference cancellation is capable of cancelling the inter-cell interference. The testing may comprise, for example, post-detection interference-to-signal-plus-noise power ratio (ISNR) of an interfering signal. Such testing may be performed after channel equalization based on channel estimation of a radio channel between the access node 110 and the interfering device. The ISNR may represent interference power versus a desired signal power at the access node 110. If the ISNR is above a determined threshold, the access node 110 may determine that the interference cancellation is not capable of cancelling the interference. If the ISNR is below the determined threshold, the access node 110 may determine that the interference cancellation is capable of cancelling the interference. In a case where an uplink sub-frame of the interfered cell 110 overlaps with an uplink sub-frame of the interfering cell, the access node 110 may determine that UL-UL interference is present. A further condition may be that the access node 112 has scheduled an uplink transmission to such a sub-frame. The access node may then carry out similar testing for whether or not the interference cancellation is capable of cancelling the UL-UL interference. The testing or evaluation of the capability of the interference cancellation in both DL-UL and UL-UL cases may also be based on past experiences of similar situations. For example, if the interference cancellation has been detected to be incapable of cancelling DL-UL interference from certain prior sub-frames, the access node may determine the interference cancellation to be incapable of cancelling the DL-UL interference. On the other hand, if the interference cancellation has been detected to be capable of cancelling DL-UL interference from certain prior sub-frames, the access node may determine the interference cancellation to be capable of cancelling the DL-UL interference. Similar analysis may be performed for the UL-UL interference.

Referring to FIG. 3, upon detecting the inter-cell interference in block 200, e.g. from the sub-frame configurations and, optionally, radio signal measurements, the access node 110 may determine the capability of the interference cancellation in block 300. In an embodiment, block 300 is performed only for uplink sub-frames of the interfered cell 100. Upon determining in block 300 that the interference cancellation is capable of cancelling the interference, the access node may determine to control the transmit power of the terminal device 122 of the interfered cell 100. The transmit power control may comprise transmitting an uplink transmit power command to the terminal device 122 in step 302. The uplink transmit power command may command the terminal device to use a power control setting that decreases the transmit power of the terminal device. In this manner, the access node 110 may reduce the UL-UL interference towards the neighbouring cells in a situation where it is capable of cancelling the inter-cell interference.

On the other hand, upon determining in block 300 that the interference cancellation is not capable of cancelling the interference, the access node may determine to control the transmit power of the terminal device 122 of the interfered cell 100 and/or control the transmit power of a terminal device of the interfering cell 102. The transmit power control may comprise transmitting an uplink transmit power command to the terminal device 122 in step 304. The uplink transmit power command may command the terminal device 122 to use a power control setting that increases the transmit power of the terminal device. In this manner, the access node 110 may improve the capability of the interference cancellation by providing the uplink signal from the terminal device 122 with a higher signal strength. Additionally or alternatively, the transmit power control in step 304 may comprise transmitting an indication to the access node 112 of the interfering cell 102 that the access node 110 has a need for reducing the uplink transmit power in the interfering cell 100. The access node 112 receiving the indication may then carry out procedures to decrease the uplink transmit power in the interfering cell. In this manner, the access node 110 may improve the capability of the interference cancellation by reducing the inter-cell interference from the interfering cell. The purpose of the uplink transmit power control may be to bring the reception strength of the desired signal above the reception strength of the interference strength at the access node. From another viewpoint, the purpose of the uplink transmit power control may be to enable the interference cancellation or even avoid the interference cancellation. The degree of increasing the transmit power of the terminal device 122 and/or requesting the decrease of the transmit power of the interfering terminal device may depend on the desired signal and interference measurements and the desired ratio between the desired signal strength and the interference strength at the access node 110.

In an embodiment, the transmit power control of only the terminal device(s) 122 of the interfered cell is an option in the case of DL-UL interference. Typically, there are limited options for controlling downlink transmit power because it may result in coverage issues. However, in the case of UL-UL interference, the access node 110 may use the options of controlling the uplink transmit power of any one of the terminal device(s) of the interfered cell 100 and the terminal device(s) of the interfering cell 102.

In an embodiment, the transmit power control of block 204 may be carried out on a sub-frame level. This may be understood such that the access node may control the uplink transmit power with a granularity of a sub-frame. For example, the wireless network may employ a radio frame structure where a single radio frame comprises a plurality of sub-frames. Each sub-frame may comprise bidirectional control and an uplink/downlink data part. The bidirectional control may refer to that the sub-frame has at least one portion for uplink control information and at least one portion for downlink control information. Some of the sub-frames may be dedicated to downlink transmissions while other may be dedicated to uplink transmission. In some systems, at least some of the sub-frames may be flexible in the sense that they may be dynamically configured as uplink sub-frames or downlink sub-frames. The scheduling of a flexible sub-frame as an uplink sub-frame or a downlink sub-frame may affect link direction of the data part: the uplink sub-frame comprises an uplink data part and the downlink sub-frame comprises a downlink data part. Accordingly, the access node may flexibly control the amount of uplink and downlink communication resources. This may also generate a situation where neighbouring cells configure the same sub-frame as an uplink sub-frame. In such situations, UL-UL interference may be present. This may also generate a situation where neighbouring cells configure the same sub-frame as for opposite link directions. In such situations, DL-UL interference may be present. Even when using static configuration of the uplink and downlink sub-frames, UL-UL and/or DL-UL interference may be present, depending on how the uplink and downlink sub-frames in different cells are configured.

Figure 4:
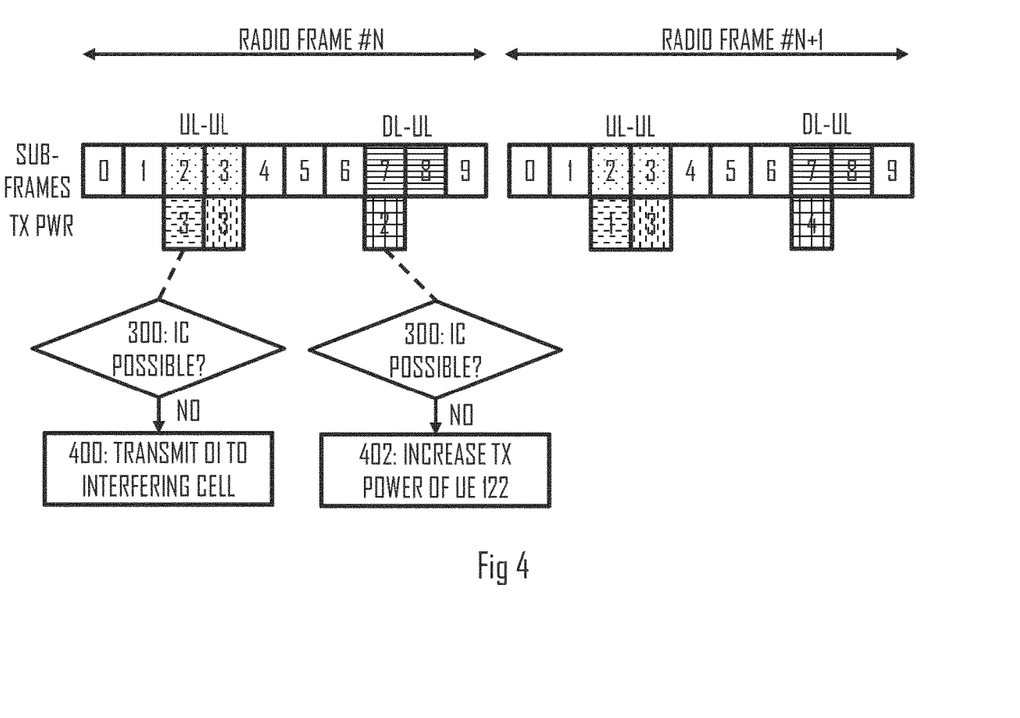
FIGS. 4 and 5 illustrate transmit power control on a sub-frame level according to an embodiment of the invention.

Let us now describe the uplink transmit power control on the sub-frame level with reference to FIG. 4. FIG. 4 illustrates a sub-frame configuration comprising ten sub-frames 0 to 9 in a radio frame of a time-division duplexed (TDD) frame configuration. It should, however, be appreciated that other embodiments may use frequency-division duplexed frame (FDD) configurations.

FIG. 4 illustrates two consecutive radio frames # N and # N+1. Both access nodes 110, 112 may be synchronized with respect to each other and employ substantially the same radio frame timing. FIG. 4 illustrates two interference cases from the viewpoint of the interfered cell controlled by the access node 110: reception in sub-frames 2 and 3 suffers from UL-UL interference from the interfering cell 102, and reception in sub-frames 7 and 8 suffers from DL-UL interference from the interfering cell 102. This applies to both radio frames # N and # N+1. Let us therefore assume that the sub-frame configuration is static or semi-static with respect to the uplink/downlink configuration in both cells 100, 102. The sub-frames 2, 3 where the UL-UL interference is present is further labelled with a dotted filling, while the sub-frames 7, 8 where the DL-UL interference is present is labelled with a horizontal lining.

The boxes below the sub-frames indicate uplink transmit powers. The value in the box may refer to an uplink transmit power region described in greater detail below. Let us assume that an uplink transmit power region set comprising uplink transmit power regions 1 and 3 are used for sub-frames associated with UL-UL interference, and that an uplink transmit power region set comprising uplink transmit power regions 2 and 4 are used for sub-frames associated with DL-UL interference. Within each uplink transmit power region set, the value may be directly proportional to the uplink transmit power, higher value indicating higher uplink transmit power (3 higher transmit power than 1, and 4 higher transmit power than 2). Let us assume that the sub-frame 2 is allocated to the terminal device 122 in the cell 100 and to the terminal device 120 in the cell 102, while the sub-frame 3 is allocated to the terminal device 122 in the cell 100 and to the terminal device 121 in the cell 102. Let us further assume that the sub-frame 7 is allocated to the terminal device 122 in the cell 100 and as a downlink subframe to at least one terminal device in cell 102. The sub-frames 2, 3, and 7 may be allocated to the different terminal devices in the cell 100 but let us assume the above-described case for the sake of simplicity. Regarding the boxes indicating the uplink transmit powers, the box below sub-frame 2 indicates the uplink transmit power of the terminal device 120 (vertical dash-lining), the box below sub-frame 3 indicates the uplink transmit power of the terminal device 121 (horizontal dash-lining), and the box below sub-frame 7 indicates the uplink transmit power of the terminal device 122 (hash-lining).

Now, let us consider some embodiments for controlling the uplink transmit power in the presence of inter-cell interference. Referring to FIG. 4, upon detecting that the interference cancellation is not possible in the sub-frame 2 (block 300), e.g. because of the UL-UL interference from the terminal device 120, the access node 110 may control the uplink transmit power in the interfering cell 102. In an embodiment, the access node may determine the source of interference, e.g. from the scheduling information received from the access node 112 of the interfering cell. The scheduling information may indicate the transmitter in the sub-frame in which the interference beyond the capabilities of the interference cancellation is detected. Accordingly, the access node 100 may be aware of the interfering device.

Upon determining the source of the interference, the access node 110 may transmit to the access node 112 the message indicating the need to adjust the uplink transmit power of the interfering device (block 400). In embodiments described below, the message is called an overload indicator (01). The overload indicator may thus indicate the interfering device and/or an interference level from the interfering device and/or from other devices in the interfering cell 102.

Upon receiving the overload indicator indicating interference from a specified terminal device, e.g. the terminal device 120, the access node 112 may perform uplink transmit power control in an attempt to reduce the transmit power of the specified terminal device. The access node 112 may reduce the transmit power of the specified terminal device or mute the terminal device in the sub-frame associated with the received overload indicator, for example. The reduction of the transmit power may be realized by changing an uplink modulation and coding scheme of the specified terminal device. A more robust modulation and coding scheme may enable reliable communication with reduced transmit power.

In the sub-frame 3, the access node 110 may determine that it is capable of cancelling the interference and, as a consequence, the access node may omit the transmission of the overload indicator with respect to the sub-frame 3, or the access node 110 may transmit an overload indicator that indicates that there is no need to perform uplink transmit power adjustment for the sub-frame 3.

In the case of DL-UL interference in sub-frame 7, the access node may determine in block 300 that the interference cancellation is not possible. Instead of transmitting the overload indicator, the access node may control the transmit power of the interfered terminal device 122 by transmitting an uplink transmit power control command to the terminal device 122 in block 402.

In an embodiment, the uplink transmit power control command is a one-bit indicator from the access node 110 specifying an uplink transmit power setting for the terminal device 122. The one-bit indicator may be understood as a transmit power toggling bit that specifies an uplink transmit power region for the terminal device 122. The terminal device may then select uplink transmit power from that region. The one-bit indicator may be transmitted on a downlink physical control channel such as an evolved physical downlink control channel (ePDCCH) of the LTE. The one-bit indicator may be transmitted in connection with the subsequent sub-frame scheduled to the terminal device, e.g. in the next radio frame # N+1, such that the terminal device 122 implements the new uplink transmit power setting in the subsequent sub-frame scheduled to it. Similarly, the access node 112 may use the one-bit indicator to adjust the uplink transmit power setting of the interfering terminal device 120. Sending of the one-bit indicator to the interfering terminal device 120 may be carried out as a response to first receiving the OI in the access node 112 from the neighbouring access node 110. The one-bit indicator may indicate the new transmit power region for the interfering terminal device 120, wherein the new transmit power region is associated with a lower uplink transmission power than the one used in the sub-frame # N.

With respect to the signalling of the one-bit indicator according to an embodiment, each sub-frame may comprise a downlink control symbol carrying the one-bit indicator. In this embodiment, the one-bit indicator may indicate the uplink transmit power region for the subsequent uplink sub-frame. As a consequence, a terminal device scheduled to transmit in a sub-frame 2 of a radio frame may read the one-bit indicator from a sub-frame 1 of the radio frame and use the uplink transmit power region indicated in the sub-frame 1. In another embodiment, a downlink sub-frame may comprise the one-bit indicator that indicates the uplink transmit power region for one or more consecutive sub-frames subsequent to the downlink sub-frame. Accordingly, the one-bit indicator may indicate the uplink transmit power region as bundled for a plurality or every consecutive uplink sub-frame following the downlink sub-frame.

The access node may transmit the overload indicator in any sub-frame of the radio frame #1 that follows the detection of the need to transmit the overload indicator. Referring to the subsequent radio frame # N+1 in FIG. 4, as a result of the overload indicator transmitted in block 400 and associated uplink transmit power control by the access node 112, the interfering terminal device 120 has reduced the transmit power in sub-frame 2, thus facilitating the interference cancellation in the access node 110. Since the terminal device 121 was found not to cause significant interference, the uplink transmit power setting of the terminal device 121 may be maintained, although the one-bit indicator verifying the current setting may still be transmitted to the terminal device. As a result of the uplink transmit power control command of block 402, the interfered terminal device 122 now transmits with increased uplink transmit power in sub-frame 7, thus facilitating interference cancellation in the access node 110.

Figure 5:
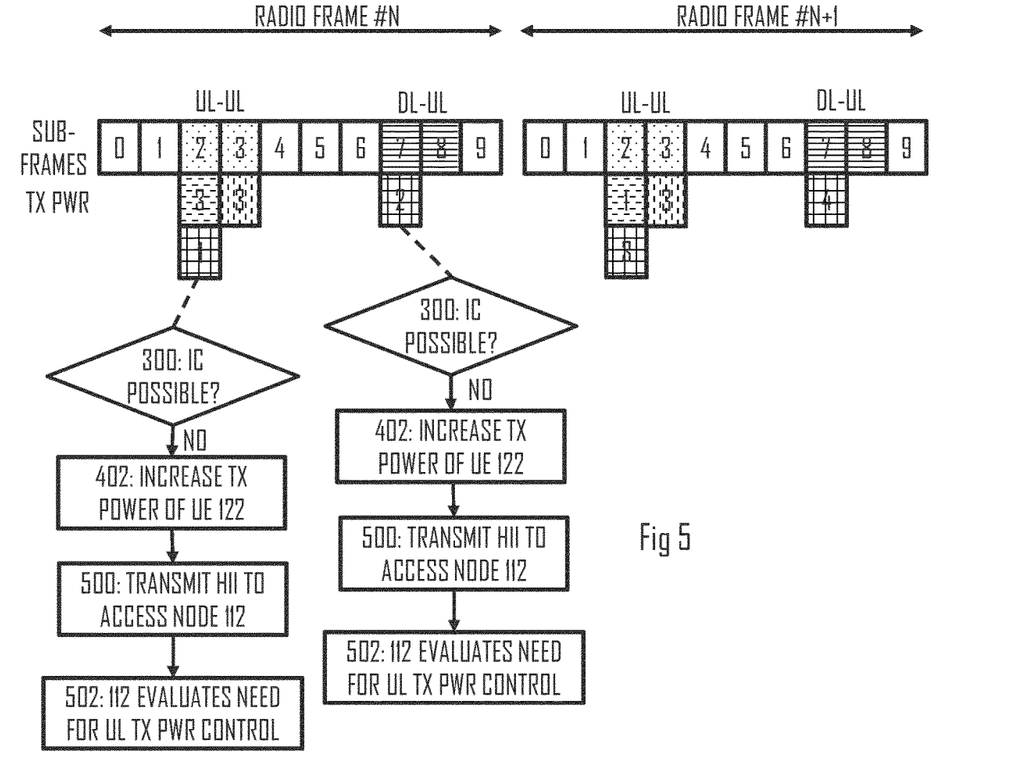

As disclosed above, in the event of UL-UL interference, the interfered access node 110 may have the option of controlling the uplink transmit power of a terminal device of the interfering cell 102 and/or the uplink transmit power of a terminal device of the interfered cell 100. FIG. 5 illustrates an embodiment where the access node 110 controls the uplink transmit power of the terminal device 122 in the case of UL-UL interference. The embodiment may be combined with the embodiment of FIG. 4 in a straightforward manner. Referring to the boxes illustrating the uplink transmit powers in FIG. 5, there is now an additional box that indicates the transmit power of the terminal device 122 in the sub-frames 2 of both radio frames # N and # N+1.

Upon detecting that the interference cancellation is not possible in the sub-frame 2 (block 300), the access node 110 may control the uplink transmit power setting of the terminal device 122 such that the uplink transmit power of the terminal device increases (block 402). Upon determining the increase the uplink transmit power of the terminal device 122, the access node 110 may determine to indicate at least to the neighbouring access nodes that the terminal device will be transmitting with increased transmit power. As a result, the access node 110 may in block 500 transmit to the neighbouring access node 112 an indicator indicating that the interference from the cell 100 is likely to increase. The indicator may be called a high-interference indicator (HII). The HII may specify the terminal device 122 transmitting with the increased transmit power. The HII may specify a new uplink transmit power region applied to the terminal device 122. The HII may further specify whether or not the terminal device 122 is located at a cell edge. As an example, the HII may comprise two bits: one for indicating whether or not the terminal device 122 is located at the cell edge and another for indicating whether or not the terminal device 122 is transmitting with increased transmit power (e.g. whether or not the transmit power of the terminal device will increase). Upon receiving the HII, the access node 112 may in block 502 evaluate the effect of the increased transmit power and proactively carry out uplink transmit power control measures to compensate for the increase in the inter-cell interference. For example, although not illustrated in FIG. 5, the access node 112 may increase the uplink transmit power of at least one terminal device, e.g. the terminal device 120 using the same sub-frame as the terminal device 122, estimated to be affected by the increased interference from the terminal device 122. In another embodiment, the access node 112 may react to the HII with uplink power control measures only if the HII indicates that the terminal device is located on the cell edge. Then, the access node 112 may send a new HII to the neighbouring cell(s) to indicate the increased transmit power of the terminal device 120. Alternatively, the access node 112 may schedule a new sub-frame for the terminal device 120.

In an embodiment, the transmission of the HII and/or reaction to the received HII in the access nodes 110, 112 may be limited to the sub-frames where the DL-UL interference is present. This may avoid the effect where the increase in the uplink transmit power of the interfered terminal device 122 causes, through the HII, increase in the transmit power of the interfering terminal device 120. For example, with reference to FIG. 5 the access node 110 may limit the transmission of the HII only to the case where it decides to increase the uplink transmit power of the terminal device in the sub-frame 7. In another embodiment related to the UL-UL interference in sub-frame 2, if the interference cancellation is not possible at the access node 110, the terminal device 122 may be controlled to increase the transmit power, and the access node 110 may transmit the HII if certain conditions are fulfilled. Such a condition may be that the terminal device 122 has a higher priority than the terminal device 120, or that backhaul latency between the access nodes 110, 112 is high or above a threshold. If the priority of the terminal device 122 is higher than the priority of the terminal device 120, the access node 112 may refrain from increasing the transmit power of the terminal device 120. Thus, the terminal device 122 has improved throughput while the terminal device 120 may have lowered throughput because of interference from the higher-priority terminal device 122. This may still achieve a minimum quality of service (QoS) for both terminal devices. One intention of using the HII in the presence of UL-UL interference may relate to latency in the sense that a terminal device 122 is controlled to take an immediate action to improve its QoS without waiting for the reaction from the terminal device 120. Upon receiving the HII, the access node 112 may select a more robust modulation and coding scheme for the terminal device 120 while still maintaining the uplink transmit power. The terminal device 120 may now have a lower throughput but sustain better interference from the terminal device 122. Such proactive decisions may be made in a radio resource management (RRM) scheduler at the access node 110 or in a central control entity based on the traffic demands, priority, and/or delay of the terminal devices 120, 122. Alternatively, the access node 112 may lower the transmit power of the terminal device 120 upon receiving the HII if that the access node 112 can carry out the interference cancellation even while the terminal device 122 has increased its transmit power.

Referring to block 402, the access node 110 may use the above-described one-bit indicator to indicate the new uplink transmit power setting for use in the subsequent radio frame # N+1. In the subsequent radio frame # N+1, the terminal device 122 will then transmit with the new uplink transmit power in the sub-frame 2, thus facilitating the interference cancellation in the access node 110.

As described above, the access node 110 may reduce the uplink transmit power of the terminal device 122 upon determining that the interference cancellation is capable of cancelling the inter-cell interference. The access node 110 may also reduce the uplink transmit power of the terminal device 122 upon detecting that the source of the interference is removed, e.g. through mobility of an interfering terminal device 120 and/or the interfered terminal device 122, or through muting or transmit power control of the interfering terminal device 120.

In the embodiments of FIGS. 4 and 5, the interference cancellation may be capable of cancelling the interference from the terminal device 121 in the sub-frame 3. Therefore, there is no need to reduce its transmission power, thus providing high throughput for the terminal device 121.

Figure 6:
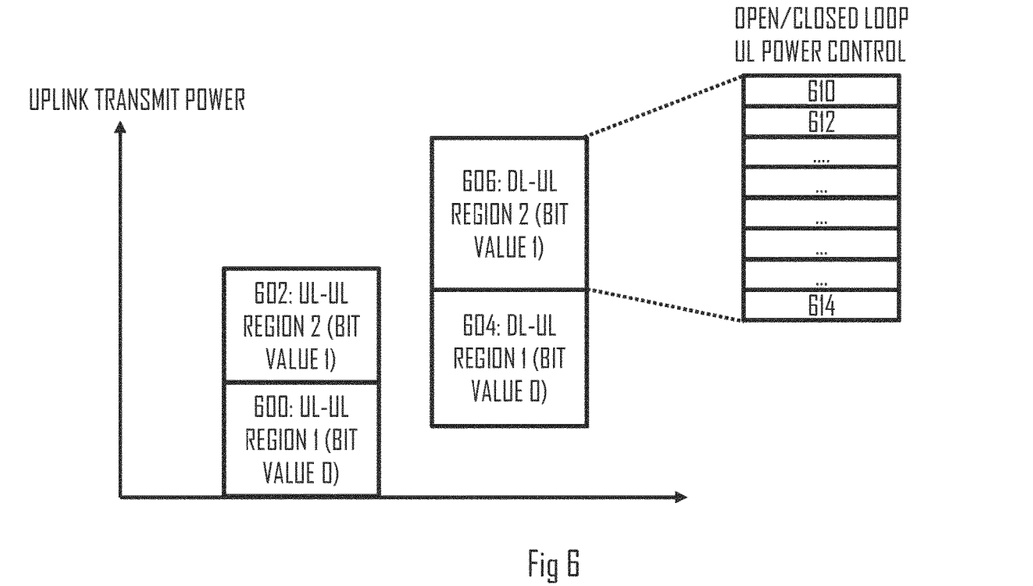
FIG. 6 illustrates transmit power control regions according to an embodiment of the invention.

Let us now describe an embodiment of the above-described uplink transmit power control settings with reference to FIG. 6. As described above, the access node(s) 110, 112 may control the uplink transmit power control regions of the terminal devices 120 to 122 on the basis of the presence/absence of the inter-cell interference beyond capabilities of the interference cancellation. In an embodiment, there are two regions. In another embodiment, there may be defined separate regions for the case of UL-UL interference and for the DL-UL interference, as illustrated in FIG. 6. The boundaries of each power control region may be unique but at least some of the power control regions may overlap, as illustrated in FIG. 6.

Referring to FIG. 6, blocks 600 and 602 illustrate two power control regions for the case of UL-UL interference: a lower power control region 600 and a higher power control region 602. The lower power control region 600 may be used in the interfered cell when the interference cancellation is capable of cancelling the inter-cell interference. The higher power control region 602 may be used in the interfered cell when the interference cancellation is not capable of cancelling the inter-cell interference. The lower power control region 600 may be used in the interfering cell upon detecting, by the access node 112, the OI or a corresponding indicator. The higher power control region 602 may be used in the interfering cell when the access node assumes that there is no need for reducing the transmit powers in an attempt to reduce the inter-cell interference.

Blocks 604, 606 illustrate two power control regions for the DL-UL interference: a lower power control region 604 and a higher power control region 606. The lower power control region 604 may be used in the interfered cell when the interference cancellation is capable of cancelling the inter-cell interference from the interfering access node 112. The higher power control region 606 may be used in the interfered cell when the interference cancellation is not capable of cancelling the inter-cell interference from the interfering access node 112.

A further uplink transmit power control mechanism may be provided to select an uplink transmit power level 610, 612 . . . 614 within the configured region. This applies to each region 600 to 606. The further uplink transmit power control mechanism may be an open loop mechanism or a closed loop mechanism. The further uplink transmit power control mechanism may be based on an estimate of a link quality between a transmitter and a receiver. Any prior art transmit power control mechanism may be provided as additional to the selection of the region 600 to 606. Uplink transmit power control commands of the further mechanism may be transmitted in connection with the one-bit indicator indicating the power control region, e.g. on the same physical control channel.

As described above, the uplink transmit power control command may be a one-bit indicator. In order to indicate one of the four power control regions, additional information may be needed. Such additional information may be transmitted on a higher protocol layer, e.g. on the same layer carrying out the sub-frame configurations. The additional information may be an information element indicating a sub-frame type allocated to the terminal device. The sub-frame type may specify a sub-frame set associated with one of the two sets of transmit power control regions 600, 602 or 604, 606. As a consequence, the one-bit indicator on the physical control channel may explicitly specify one of the four regions 600 to 606.

In an embodiment, the boundaries of at least one, or even all, of the transmit power control regions 600 to 606 may be adjusted. The boundaries may be negotiated between the access nodes, for example. The regions may depend on the cell sizes of the cells 100, 102, for example. The regions may also be terminal-device-specific and be based on measurements, such as path loss between a terminal device and a serving access node. Bandwidth allocated to the terminal device may also affect the selection of the transmit power control region boundaries. In yet another embodiment, the access node 110 may measure interference level from a strongest interferer of the interfering cell and select the boundaries of the power control regions on that basis. For example, the lower boundary of the region 602 may be selected to be higher than the measured interference level. A scaling factor or an offset factor may be applied to ensure that a desired signal is received with a higher reception strength than the measured interference level or, more generally, with a reception strength that enables reliable decoding for a selected modulation and coding scheme even in the presence of the measured interference level.

Let us now consider throughput with reference to the FIGS. 4 to 6. Let us compare some cases of uplink transmit power regions of the terminal devices 120, 122:

1) The terminal device 120 uses the uplink transmit power region 602 while the terminal device 122 uses the uplink transmit power region 600. This scenario may provide a high throughput if the higher uplink transmit power region of the interfering terminal device enables better detection of the interfering signal at the access node 110 and, thus, better interference cancellation. If the terminal device 122 does not cause UL-UL interference in the access node 112, the total throughput may be high.

2) The terminal devices 120, 122 both use the uplink transmit power region 600. This scenario may provide a low throughput if the access node 110 cannot cancel the interference from the terminal device 120. Upon determining to lower the uplink transmit power region of the terminal device 122, the access node 110 may transmit the OI to lower the uplink transmit power region of the terminal device 120, too.

3) The terminal devices 120, 122 both use the uplink transmit power region 602. This scenario may also provide a low throughput if the access node 110 cannot cancel the interference from the terminal device 120.

The access node 110 may attempt to pursue for the option 1) with the attempt of optimizing the total throughput. This may be realized by the access node 110 attempting to transit from case 2) to case 1) by transmitting the OI indicating the high interference, for example. Another option might be to increase the transmit power of the terminal device 122 and to transmit the HII. The access node 110 may attempt to transit from case 3) by transmitting the OI indicating the extreme interference, thus causing the access node 112 to reduce the uplink transmit power of the interfering terminal device 120. A secondary option could be to optimize the power consumption in the terminal devices 120, 122 and, as a consequence, option 2) may be preferred over option 3). Let us now consider the same options between the terminal device 121 and the access node 110 that are more separated from one another in terms of distance. Now, the interference cancellation may not be possible because of low signal power from the terminal device 121 at the access node and, as a consequence, case 1) may not be available. Therefore, case 2) may be preferred over case 3). In some cases, e.g. when latency between the access nodes 110, 112 is high, the access node may prefer case 3) over case 2).

Figure 7:
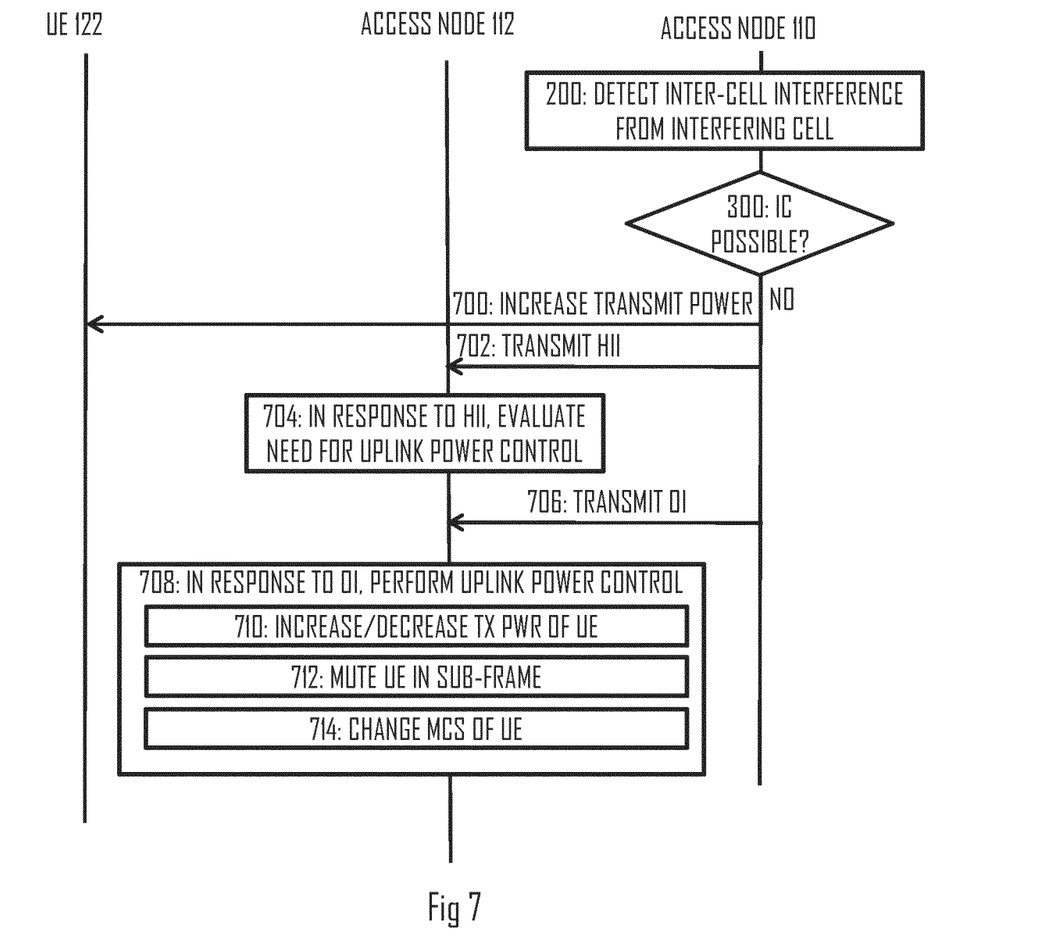
FIG. 7 illustrates a signalling diagram of another embodiment for interference control in a wireless system of FIG. 1.

Let us now describe an embodiment of a procedure for interference control with reference to a signalling diagram of FIG. 7. Upon detecting the interference, e.g. on the basis of received scheduling information or sub-frame configuration information from an access node of a neighbouring cell and interference measurements, the access node 110 may test the interference cancellation and determine whether or not the interference cancellation will be capable of cancelling the inter-cell interference. Upon determining that the interference cancellation is inadequate and the uplink power control is needed to support the interference cancellation in block, the access node may control a terminal device (UE) 122 to increase transmit power (step 700) in the above-described manner. This uplink power control measure may also trigger the transmission of the HII to the neighbouring access node(s) 112 (step 702). The HII may cause the access node 112 to evaluate the need for the uplink power control in the neighbouring cell (block 704), as described above. It may cause the access node to increase the transmit power of a terminal device scheduled to the same sub-frame as the terminal device 122 indicated by the HII, e.g. if both terminal devices are scheduled to carry out uplink transmission in the same sub-frame. As already described, the access nodes may share the scheduling information and the sub-frame configuration to enable the interference control.

Step 700 aims to improve a desired signal power in the access node 110. As another tool, the access node may attempt to reduce the interference level. For that purpose, the access node may use the overload indicator (01) transmitted to the access node 112 of the interfering cell 102 in block 706.

The OI may indicate the interfering terminal device and, in some embodiments, the degree of interference from the interfering terminal device. The OI may specify a first level, e.g. a low or moderate interference level, which may indicate to the access node 112 that the interference signal is received with a signal level that is below a reception strength of a desired signal, e.g. from the terminal device 122. As a consequence, the access node 112 may determine that the interference level from the interfering terminal device is tolerable, and the access node 112 may use certain criterion for determining whether to decrease the transmit power of the interfering terminal device, mute the interfering terminal device in the sub-frame, or even to increase the transmit power of the interfering terminal device. The other criterion may involve traffic priority of the interfering terminal device, for example. In general, the access node 112 may set a low priority for reducing the transmit power of the interfering terminal device. Functions of first level may be foreseen to be handled by the uplink transmit power levels within the current uplink transmit power region, e.g. under closed loop power control within the region. Instead of the first level, two levels may be provided: one for the low interference level causing no action to be taken in the access node 112 and one for the moderate interference level causing the closed loop power control within the current uplink transmit power region.

The OI may specify a second level, e.g. a high interference level, The first and second level may both (or all) indicate power levels that are below a threshold, wherein the threshold may be the reception strength of the desired signal or a certain amount above the reception strength of the desired signal. The second level may indicate that the interference cancellation may still be capable of cancelling the inter-cell interference under some conditions. When the access node 112 of the interfering cell receives the OI specifying the second level, it may adjust the uplink transmit power region of the interfering terminal device 120 so that the access node has better capability of performing the interference cancellation. This may include even increasing the uplink transmit power of the interfering terminal device so that the interfering signal can be better detected in the access node 110, thus facilitating the interference cancellation. The situation of the second level may happen when the same transmit power levels are used in both cells 100, 102 and the terminal devices 120, 122 are both located at the cell edge. Other responses to high may include lowering the transmit power of the terminal device 120 or muting the terminal device in the sub-frame.

The OI may specify a third level, e.g. an extra-high interference level. The extra high level may indicate that interfering terminal device transmits a signal that is received as several decibels higher than the desired signal and that the interference cancellation is not possible. The threshold for the decibels may be configured on a radio resource control layer, e.g. 10 dB higher than the desired signal. In such a case, the received power levels may be mismatched across the cells, e.g. the interfering signal may be several decibels higher at the access node 110 than the desired signal from the terminal device 122, and the interference cancellation may not be possible at the access node 110. The third level may trigger different functions for resolving the interference problem with respect to the second level functions. When the access node 112 of the interfering cell receives the OI indicating the third level 'extra high', it knows that the interference cancellation is not possible and, hence, may either lower the uplink transmit power of the interfering terminal device 120 or just completely mute the terminal device 120 in the sub-frame. The access node 110 may thus use the second level to pursue trials of interference cancellation, while the third level may be used to trigger lowering of the uplink transmit power region of the interfering terminal device 120 because the access node 110 has made a decision not to pursue the trials of the interference cancellation. In general, the access node 112 may set a high priority for reducing the transmit power of the interfering terminal device.

The uplink transmit power of the interfering terminal device is controlled in block 708. The access node 112 may control the uplink transmit power with the selection of the uplink transmit power setting (block 710), e.g. by selecting one of the uplink transmit power regions of FIG. 6 (region 600 or 602). As another tool for the uplink power control in the sub-frame, the access node may reschedule the interfering terminal device to transmit in another sub-frame (block 712). Accordingly, the interfering terminal device is muted in the sub-frame where the access node 110 has reported the inter-cell interference from the interfering terminal device. In the case of DL-UL interference, the access node 112 may mute itself in the sub-frame where the access node 110 has reported DL-UL interference from the access node. Accordingly, the access node may schedule the sub-frame as an uplink sub-frame of a terminal device that does not cause interference towards the access node 110. As a further tool, the access node 112 may select a more robust modulation and coding scheme for the interfering terminal device (block 714). This may reduce the throughput but reduce the inter-cell interference and provide a better system performance.

Figure 8:
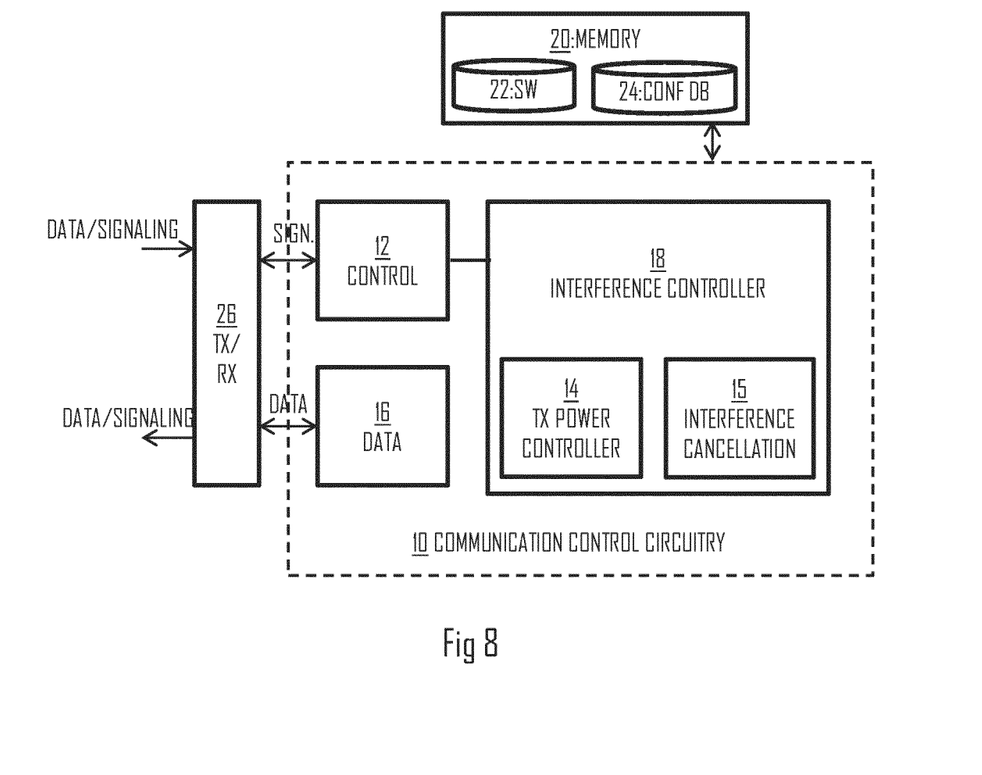
FIG. 8 illustrates a block diagram of a structure of an apparatus according to an embodiment of the invention.

FIG. 9 illustrates an apparatus configured to carry out the functions described above in connection with the access nodes 110, 112. The apparatus may be an electronic device comprising electronic circuitries. As described above, the description is provided in the context where one access node manages the interfering cell 102 and the other access node manages the interfered cell. However, the above-described functions of any access node may be provided in each access node. For example, the access node 110 may receive OIs from the access node 112 and react to the received OIs in the above-described manner. The apparatus may comprise a communication control circuitry 10 such as at least one processor, and at least one memory 20 including a computer program code (software) 22 wherein the at least one memory and the computer program code (software) are configured, with the at least one processor, to cause the apparatus to carry out any one of the embodiments of the access node described above.

The memory 20 may be implemented using any suitable data storage technology, such as semiconductor based memory devices, flash memory, magnetic memory devices and systems, optical memory devices and systems, fixed memory and removable memory. The memory may comprise a configuration database 24 for storing configuration data for communicating in a cell over a radio interface. For example, the configuration database 24 may store frame configurations supported by the access node, interference cancellation parameters, uplink transmit power control region settings, etc.

The apparatus may further comprise a communication interface (TX/RX) 26 comprising hardware and/or software for realizing communication connectivity according to one or more communication protocols. The communication interface may provide the apparatus with communication capabilities to communicate in the cellular communication system and enable communication with other access nodes and terminal devices, for example. The communication interface 26 may comprise standard well-known components such as an amplifier, filter, frequency-converter, (de)modulator, and encoder/decoder circuitries and one or more antennas. The communication interface 26 may comprise radio interface components providing the apparatus with radio communication capability in the cell.

In an embodiment of FIG. 8, at least some of the functionalities of the access node may be shared between two physically separate devices, forming one operational entity. Therefore, the apparatus may be seen to depict the operational entity comprising one or more physically separate devices for executing at least some of the described processes. Thus, the apparatus of FIG. 8, utilizing such a shared architecture, may comprise a remote control unit (RCU), such as a host computer or a server computer, operatively coupled (e.g. via a wireless or wired network) to a remote radio head (RRH) located in a base station site. In an embodiment, at least some of the described processes of the access node may be performed by the RCU. In an embodiment, the execution of at least some of the described processes may be shared among the RRH and the RCU. In such a context, RCU may comprise the components illustrated in FIG. 8, and the communication interface 26 may provide the RCU with the connection to the RRH. The RRH may then comprise radio frequency signal processing circuitries and antennas, for example.

In an embodiment, the RCU may generate a virtual network through which the RCU communicates with the RRH. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (i.e. to the RCU). External network virtualization is targeted to optimized network sharing. Another category is internal virtual networking which provides network-like functionality to the software containers on a single system. Virtual networking may also be used for testing the terminal device.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

Referring to FIG. 8, the apparatus may comprise a control circuitry 12 carrying out control plane signalling with terminal devices, other access nodes of the radio access network, and with network elements of the core network 130. The control circuitry 12 may carry out at least some functions in steps 204, 302, 304, 400, 402, 500, 502, 700, 702, 706.

The apparatus may further comprise an interference controller 18 configured to manage the interference control in the cell managed by the access node. In some embodiments, the interference control is carried out in cooperation with neighbouring access nodes, as described above. The interference controller 18 may comprise an interference cancellation circuitry 15 configured to realize an interference cancellation algorithm, e.g. a maximum likelihood algorithm. The interference controller 18 may use the interference cancellation circuitry 15 when performing the testing in blocks 202 and 300. Upon failed testing, the interference controller 18 may call a transmit power controller 14 to carry out control of uplink transmit power settings of at least one terminal device. The uplink transmit power controller 14 may carry out the adjustments of the uplink transmit power settings of an interfered terminal device in the cell of the access node comprising the apparatus and/or the adjustments of the uplink transmit power settings of an interfering terminal device in another cell. Accordingly, the transmit power controller may carry out operations of blocks 204, 302, 304, 400, 402, 700, 706. The transmit power controller 14 may also handle the uplink transmit power control in response to indicators received from another access node through the control circuitry 12. For example, upon receiving the OI or the HII, the transmit power controller may carry out functions for determining whether or not to adjust uplink transmit power of one or more terminal devices in the cell managed by the access node.

The apparatus may further comprise a data communication circuitry 16 configured to carry out transmission and reception of payload data with the terminal devices.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 2 to 7 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 2 to 7 or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 2 to 7 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method comprising:
   detecting, by an access node managing an interfered cell in a cellular communication system, inter-cell interference from an interfering cell;
   determining whether or not interference cancellation performed for a signal received through the access node is capable of cancelling said inter-cell interference; and
   controlling, on a basis of a result of said determining, uplink transmit power of a terminal device on time-frequency resources allocated to the terminal device, wherein the terminal device is a terminal device of the interfering cell or a terminal device of the interfered cell, and wherein said controlling the uplink transmit power further comprises at least one of:
      in response to determining that the interference cancellation is not capable of cancelling said inter-cell interference, indicating to an access node of the interfering cell a need to control uplink transmit power of the terminal device of the interfering cell,
      in response to determining that the interference cancellation is not capable of cancelling said inter-cell interference, controlling uplink transmit power of the terminal device of the interfered cell, and
      in response to determining that the interference cancellation is capable of cancelling said inter-cell interference, indicating to the access node of the interfered cell that there is no need to control the uplink transmit power of the terminal device.

2. The method of claim 1, wherein the uplink transmit power of the terminal device is controlled on a sub-frame level.

3. The method of claim 1, wherein the terminal device is controlled to use a first uplink transmit power level when the interference cancellation is capable of cancelling the inter-cell interference, and wherein the terminal device is controlled to use a second uplink transmit power level when the interference cancellation is incapable of cancelling the inter-cell interference.

4. The method of claim 3, wherein the first uplink transmit power level is lower than the second uplink transmit power level.

5. The method of claim 1, further comprising determining whether the inter-cell interference is uplink-to-uplink type of interference or downlink-to-uplink type of interference and controlling the uplink transmit power further on the basis of a result of said determining said type of interference.

6. The method of claim 5, further comprising:
providing at least a first and a second power control region for use in the presence of the uplink-to-uplink type of interference;
providing at least a third and a fourth power control region for use in the presence of the downlink-to-uplink type of interference, wherein the first, second, third and fourth power control region all define a different power control region.

7. The method of claim 6, further comprising providing a second uplink transmit power control mechanism within each of the first, second, third and fourth power control region.

8. The method of claim 1, wherein said controlling the uplink transmit power comprises transmitting a one-bit transmit power control indicator defining one of a plurality of transmit power control settings.

9. The method of claim 8, wherein the one-bit transmit power control indicator is transmitted in a first sub-frame and wherein the transmit power control indicator indicates a transmit power setting for a second sub-frame subsequent to the first sub-frame.

10. The method of claim 1, further comprising:
upon determining to increase a transmit power level of the terminal device of the interfered cell, causing transmission of a high interference indicator to at least one neighbouring cell, the high interference indicator indicating that the terminal device will be transmitting on a higher transmit power level.

11. The method of claim 1, further comprising:
acquiring a high interference indicator from at least one neighbouring cell, the high interference indicator indicating that a terminal device of the at least one neighbouring cell will be transmitting on a higher transmit power level; and
upon receiving the high interference indicator, increasing uplink transmit power of the terminal device, wherein the terminal device belongs to said interfered cell.

12. The method of claim 1, further comprising transmitting, upon determining that the interference cancellation is not capable of cancelling the interference, an overload indicator to the interfering cell, wherein the overload indicator requests the interfering cell to reduce an uplink transmit power level of the terminal device of the interfering cell.

13. A non-transitory computer-readable medium comprising instructions which, when loaded into an apparatus, execute the method according to claim 1.

14. An apparatus comprising:
at least one processor, and
at least one memory comprising a computer program code, wherein the processor, the memory, and the computer program code are configured to cause the apparatus to:
detect, inter-cell interference from an interfering cell;
determine whether or not interference cancellation performed for a received signal is capable of cancelling said inter-cell interference; and
control, on a basis of a result of said determining, uplink transmit power of a terminal device on time-frequency resources allocated to the terminal device, wherein the terminal device is a terminal device of the interfering cell or a terminal device of the interfered cell, and wherein said controlling the uplink transmit power further comprises at least one of:
in response to determining that the interference cancellation is not capable of cancelling said inter-cell interference, indicating to an access node of the interfering cell a need to control uplink transmit power of the terminal device of the interfering cell,
in response to determining that the interference cancellation is not capable of cancelling said inter-cell interference, controlling uplink transmit power of the terminal device of the interfered cell, and
in response to determining that the interference cancellation is capable of cancelling said inter-cell interference, indicating to the access node of the interfered cell that there is no need to control the uplink transmit power of the terminal device.

15. The apparatus of claim 14, wherein the terminal device is controlled to use a first uplink transmit power level when the interference cancellation is capable of cancelling the inter-cell interference, and wherein the terminal device is controlled to use a second uplink transmit power level when the interference cancellation is incapable of cancelling the inter-cell interference.

16. The apparatus of claim 15, wherein the first uplink transmit power level is lower than the second uplink transmit power level.

17. The apparatus of claim 14, wherein the processor, the memory, and the computer program code are configured to cause the apparatus to determine whether the inter-cell interference is uplink-to-uplink type of interference or down-link-to-uplink type of interference and to control the uplink transmit power further on the basis of a result of said determining said type of interference.

18. The apparatus of claim 17, wherein the processor, the memory, and the computer program code are configured to cause the apparatus to:
provide at least a first and a second power control region for use in the presence of the uplink-to-uplink type of interference;
provide at least a third and a fourth power control region for use in the presence of the downlink-to-uplink type of interference, wherein the first, second, third and fourth power control region all define a different power control region.

* * * * *